(12) United States Patent
Chiang et al.

(10) Patent No.: US 10,575,248 B2
(45) Date of Patent: Feb. 25, 2020

(54) WIRELESS SENSING NETWORK COMMUNICATION METHOD

(71) Applicant: NANNING FUGUI PRECISION INDUSTRIAL CO., LTD., Nanning (CN)

(72) Inventors: Chia-An Chiang, New Taipei (TW); Chia-Ming Chang, New Taipei (TW); Chung-Yu Hsiao, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/225,866

(22) Filed: Dec. 19, 2018

(65) Prior Publication Data

US 2019/0124590 A1 Apr. 25, 2019

Related U.S. Application Data

(63) Continuation-in-part of application No. 15/391,845, filed on Dec. 28, 2016, now Pat. No. 10,194,387.

(51) Int. Cl.
*H04W 4/00* (2018.01)
*H04W 52/02* (2009.01)
(Continued)

(52) U.S. Cl.
CPC ....... *H04W 52/0203* (2013.01); *H04L 12/281* (2013.01); *H04L 12/2809* (2013.01);
(Continued)

(58) Field of Classification Search
CPC ................ H04L 47/10; H04L 12/2803; H04L 2012/5608; H04W 4/06; H04W 4/18;
(Continued)

(56) References Cited

U.S. PATENT DOCUMENTS 10,051,060 B2 * 8/2018 Basu ...................... H04L 67/12
10,178,206 B2 * 1/2019 Tessiore .................. H04L 69/18
(Continued)

OTHER PUBLICATIONS

Lin et al, An Experimental System for MQTT/CoAP-based IoT Applications in IPv6 over Bluetooth Low Energy, Journal of Universal Computer Science, vol. 24, No. 9, 22 pages, Sep. 2018.*
(Continued)

*Primary Examiner* — Frank Duong
(74) *Attorney, Agent, or Firm* — ScienBiziP, P.C.

(57) ABSTRACT

A wireless sensing network communication method is disclosed in which, describes a gateway device and backup gateway devices in a wireless sensing network communicate in a subscribe-publish-based scheme. The gateway device subscribes to a device capability event. The gateway device subscribes to a network disconnection event. When network disconnection occurs, the gateway device publishes a network disconnection event. The backup gateway devices receive notification of the network disconnection event and publish device capability events in response. The gateway device selects a backup gateway device as a primary gateway in the wireless sensing network fulfill failover purpose.

9 Claims, 8 Drawing Sheets

(51) Int. Cl.
  *H04W 4/38* (2018.01)
  *H04W 28/02* (2009.01)
  *H04W 8/22* (2009.01)
  *H04L 12/24* (2006.01)
  *H04L 12/28* (2006.01)
  *H04W 84/18* (2009.01)
  *H04W 88/16* (2009.01)

(52) U.S. Cl.
  CPC ...... *H04L 12/2816* (2013.01); *H04L 12/2838* (2013.01); *H04L 41/0668* (2013.01); *H04W 4/38* (2018.02); *H04W 8/22* (2013.01); *H04W 28/0215* (2013.01); *H04W 52/0212* (2013.01); *H04W 52/0251* (2013.01); *H04L 2012/2841* (2013.01); *H04W 84/18* (2013.01); *H04W 88/16* (2013.01)

(58) Field of Classification Search
  CPC ..... H04W 40/02; H04W 40/24; H04W 40/34; H04W 24/10; H04W 48/18; H04W 52/02; H04W 52/0203; H04W 72/04; H04W 74/08; H04W 80/04; H04W 84/12; H04W 84/18; H04W 88/06; H04W 88/08
  See application file for complete search history.

(56) References Cited

U.S. PATENT DOCUMENTS

2009/0172117 A1* 7/2009 Bedi ................. H04W 52/0216
  709/206
2019/0205541 A1* 7/2019 Zimny ................. G06F 21/575

OTHER PUBLICATIONS

Hou et al, Internet of Things Cloud: Architecture and Implementation, IEEE, 8 pages, Dec. 2016.*

Boyd et al, Building Real-time Mobile Solutions with MQTT and IBM MessageSight, Redbooks, 269 pages, Oct. 2014.*

* cited by examiner

WIRELESS SENSING NETWORK COMMUNICATION METHOD

CROSS-REFERENCE TO RELATED APPLICATIONS

This application is a continuation in part of U.S. application Ser. No. 15/391,845, entitled "COORDINATOR AND CONTROL METHOD THEREOF, WIRELESS SENSING NETWORK COMMUNICATION SYSTEM AND METHOD," filed on Dec. 28, 2016, published as US 20180184368 A1. The entirety of each of the above-mentioned patent application is hereby incorporated by reference herein.

FIELD

The subject matter herein generally relates to a computer technology, and in particular relates to a wireless sensing network communication system and method.

BACKGROUND

In smart home technology, all home devices in a house are connected to a smart home network system, so as to allow a user to easily control the home devices. The smart home network system includes a plurality of sensors, and each of the sensors can be battery powered. It is challenging for the smart home network system to reduce power consumption of the sensors.

BRIEF DESCRIPTION OF THE DRAWINGS

Implementations of the present technology will now be described, by way of example only, with reference to the attached figures.

DETAILED DESCRIPTION

Figure 1:
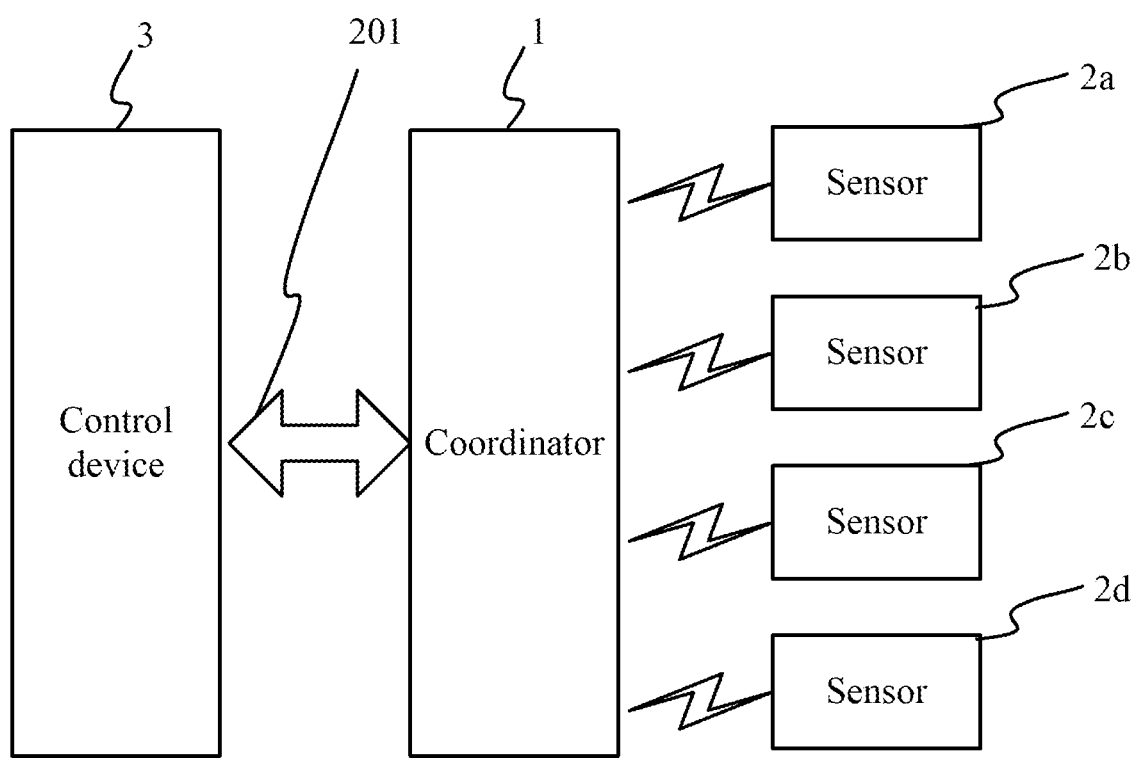
FIG. 1 is a diagram of an embodiment of a coordinator of a smart home system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The wireless sensing network communication system and method provides a failover method for a gateway device and a coordinator in a wireless sensing network. FIG. 1 illustrates a smart home system. A smart home system may comprise a plurality of internet of things (IoT) devices. The smart home system comprises a coordinator 1, a control device 3 and a plurality of sensors.

In one embodiment, the sensors can be smart home sensors. For example, the sensors can be a door sensor, a light sensor, a motion sensor, an air sensor, or a temperature sensor. Each of the sensors can be supplied with power by a battery or an adaptor. The plurality of sensors in this embodiment comprises four sensors 2a to 2d.

In one embodiment, the coordinator 1 can communicate with the control device 3 and the sensors 2a to 2d through a wireless communication. The wireless communication can be ZIGBEE technology for example, but is not limited by the embodiments herein.

The coordinator 1 is configured to receive and process information sensed by the sensors 2a to 2d. The coordinator 1 is further configured to receive a command from the control device 3.

In one embodiment, the coordinator 1 can be a gateway device. The control device 3 can be a mobile phone, a computer, or a smart watch. The command can be transmitted from the mobile phone. The coordinator 1 can manage the sensors 2a to 2d according to the command.

In one embodiment, the sensor 2a comprises two operation modes. The two operation modes are sensor mode and coordinator mode. A software module that has partial functions complying with ZIGBEE standards can be added to the sensor 2a. The sensors 2b to 2d comprise one operation mode (sensor mode).

When the sensor 2a is in the sensor mode, the sensor 2a is a common sensor, and the sensor 2a provides data as electrical signal. When the sensor 2a in the coordinator mode, the sensor 2a can act as an alternative coordinator. The sensor 2a can thus replace the coordinator 1 to receive and process data from the sensors 2b to 2d.

Figure 2:
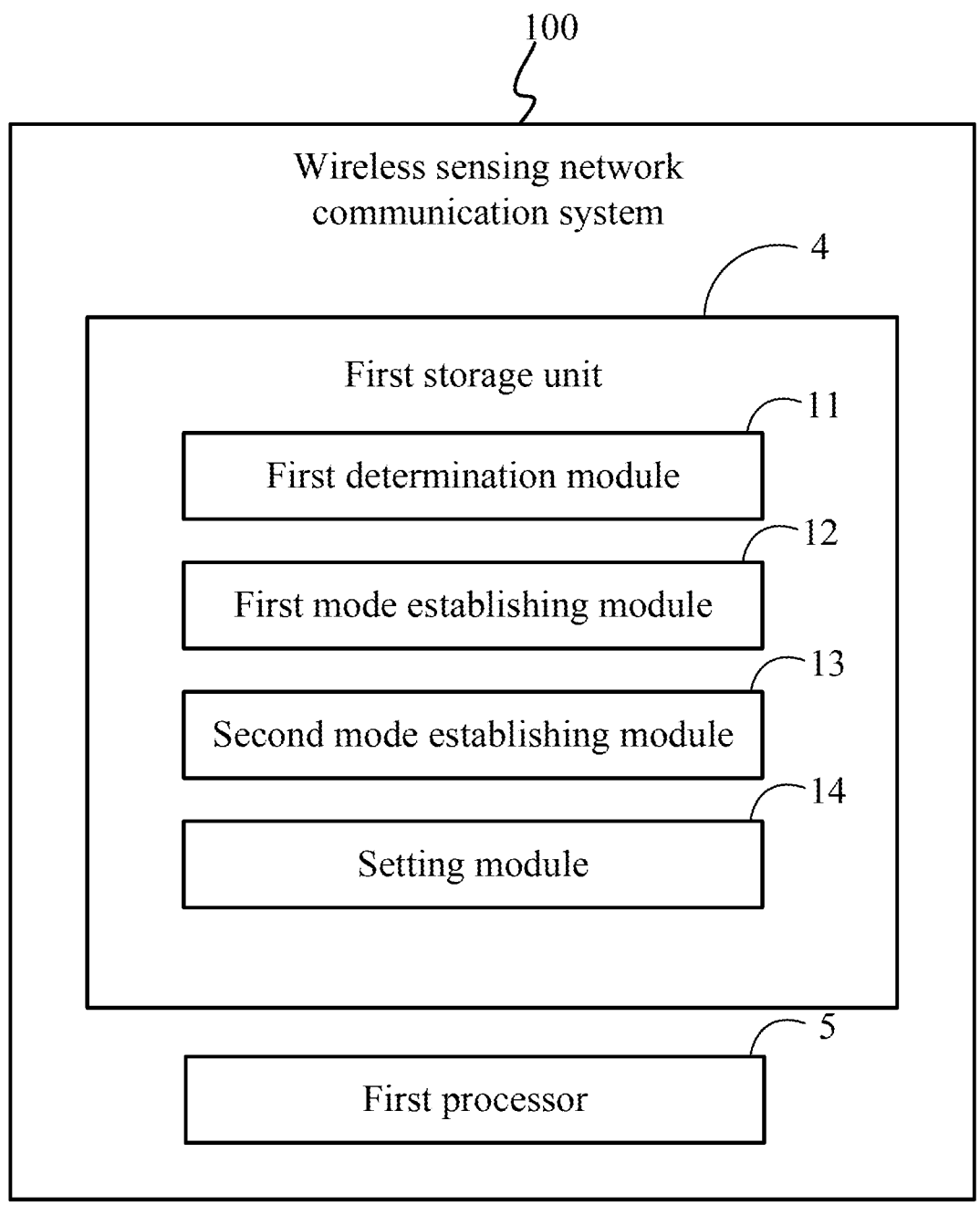
FIG. 2 is a block diagram of an embodiment of a wireless sensing network communication system.

FIG. 2 illustrates a wireless sensing network communication system 100. The wireless sensing network communication system 100 can comprise at least one first storage unit 4 and at least one first processor 5. The wireless sensing network communication system 100 can further include a plurality of modules, such as a first determination module 11, a first mode establishing module 12, a second mode establishing module 13, and a setting module 14. The modules 11-14 can include one or more software programs in the form of computerized codes stored in the first storage unit 4. The computerized codes can include instructions that can be executed by the first processor 5 to provide functions for the modules 11-14.

The first determination module 11 can detect the coordinator 1. When the coordinator 1 is detected by the first determination module 11, the first mode establishing module 12 is configured to control the sensors 2a to 2d to transmit access requests to the coordinator 1. The second mode establishing module 13 is configured to control the sensor 2a to switch to the coordinator mode, as an alternative coordinator, and control the sensors 2b to 2d to transmit access requests to the sensor 2a, in response to the coordinator 1 being not detected. For example, the first determination module 11 cannot detect the coordinator 1 when the coordinator 1 is in an abnormal state, the coordinator 1 is under maintenance, or the coordinator 1 is in a system update state, therefore the sensor 2a can temporarily act as the alternate coordinator in place of the unavailable coordinator 1.

When the coordinator 1 disconnects communication with the sensors 2b to 2d, the sensors 2b to 2d may repeatedly search for the coordinator 1, and the battery of each of the sensors 2b to 2d is quickly reduced. When the sensor 2a is switched to be the alternative coordinator, the sensors 2b to 2d can access the alternative coordinator, and the sensors 2b to 2d will stop searching for the coordinator 1. Battery consumption of each of the sensors 2b to 2d is thus reduced.

In one embodiment, the first determination module 11 is further configured to determine whether the sensors 2a to 2d can access the coordinator 1. When the sensors 2a to 2d can access the coordinator 1, the sensors 2a to 2d will communicate with the coordinator 1.

When the sensor 2a cannot access the coordinator 1, the second mode establishing module 13 is further configured to control the sensor 2a to switch to be the alternative coordinator. When the sensor 2b cannot access the coordinator 1, the first determining module 11 is further configured to determine whether an alternative coordinator is detected. When the first determining module 11 cannot detect the alternative coordinator, the setting module 14 is configured to set the sensor 2b to redetect the coordinator 1 after a predetermined time.

When the first determining module 11 detects the alternative coordinator (the sensor 2a in coordinator mode), the second mode establishing module 13 is further configured to control the sensor 2b to transmit access request to the alternative coordinator. When the sensor 2b can access the alternative coordinator, the sensor 2b can communicate with and send data to the alternative coordinator. When the sensor 2b cannot access the alternative coordinator, the setting module 14 is further configured to set the sensor 2b to redetect coordinator 1 after predetermined time has passed.

In one embodiment, the predetermined time can be set to five minutes. Descriptions and configurations of the sensors 2c and 2d being unable to access the coordinator 1 are omitted, as these being substantially the same as for those of the sensor 2b.

In one embodiment, when the coordinator 1 resumes operations and is detected by the first determining module 11, the second mode establishing module 13 is further configured to control the sensor 2a to switch from the coordinator mode to the sensor mode. The sensor 2a is controlled to disconnect from the sensors 2b to 2d. Thereby, the sensors 2a to 2d transmit future access requests to the coordinator 1.

Figure 3:
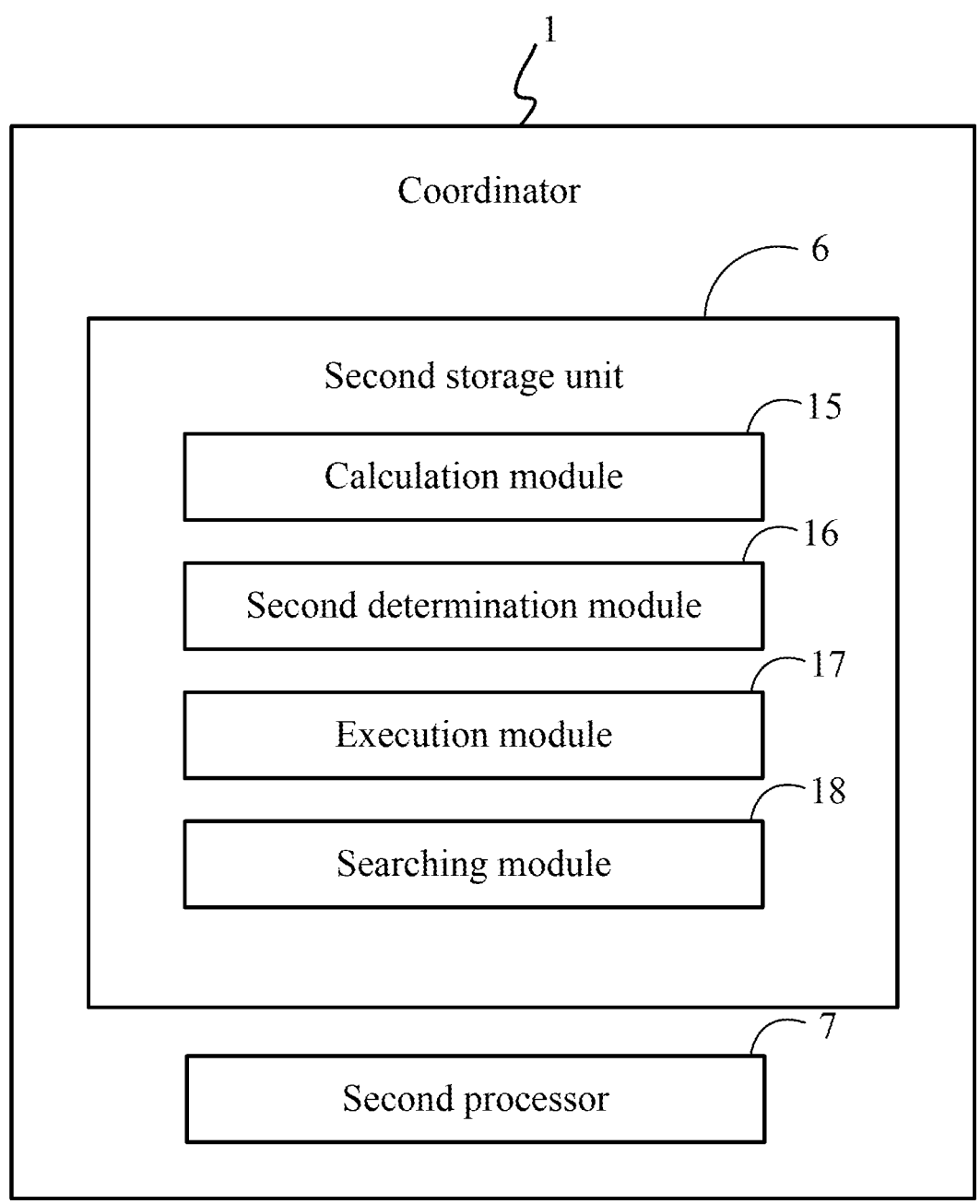
FIG. 3 is a block diagram of an embodiment of a coordinator in a smart home system.

FIG. 3 illustrates the coordinator 1 comprising at least one second storage unit 6 and at least one second processor 7.

The coordinator 1 can further include a plurality of modules, such as a calculation module 15, a second determination module 16, an execution module 17, and a searching module 18. The modules 15-18 can include one or more software programs in the form of computerized codes stored in the second storage unit 6. The computerized codes can include instructions that can be executed by the second processor 7 to provide functions for the modules 15-18.

The calculation module 15 is configured to receive an execution command of an event and calculates a period of time for execution of the event. The execution command can be transmitted by the control device 3. The period of time for execution is the length of time that the coordinator 1 requires to execute and complete the event.

In one embodiment, when the coordinator 1 is executing the event, the coordinator 1 will disconnect from the sensors 2a to 2d. The event can be a software update or a system update for example. The sensors 2a to 2d are set to update and report the data they have sensed in cycles. Each cycle can be about 10 minutes, but is not limited to the embodiment herein. The time of each cycle is a cycle time in the instant disclosure.

The second determination module 16 is configured to determine whether the period of time for executing the event (execution time) is greater than a first predetermined time. The first predetermined time can be set according to the cycle times of the sensors 2a to 2d.

When the execution time is less than the first predetermined time, the sensors 2a to 2d do not repeatedly search for the coordinator 1. The execution module 17 is configured to inform an event to each of sensors 2a to 2d and the execution module 17 executes the event as commanded.

For example, the coordinator 1 may receive a system update command and calculate that the system updating needs 5 minutes. The event is the system update and the execution time of the system updating is 5 minutes. The first predetermined time can be 10 minutes. The execution time of the system update (5 minutes) is less than the first predetermined time (10 minutes), thus the execution module 17 informs the system update to each of the sensors 2a to 2d. After the execution module 17 informs, the execution module 17 executes the system update as commanded. Each of the sensors 2a to 2d disconnects from the coordinator 1 for a period of 5 minutes. The sensors 2a to 2d do not search for the coordinator 1 within the period of 5 minutes.

In one embodiment, the second determination module 16 is further configured to determine whether each of the sensors 2a to 2d receives an event notification. When each of the sensors 2a to 2d receives the event notification, the execution module 17 executes the event according to the execution command. For example, when each of the sensors 2a to 2d receives the system update notification, the execution module 17 executes the system update. If the sensor 2a does not receive the system update notification, the second determination module 16 is further configured to determine whether a notification time is greater than a second predetermined time. When the notification time is greater than the second predetermined time, the execution module 17 executes the event as commanded.

In one embodiment, the notification time is the length of time that the execution module 17 took to inform the sensors 2a to 2d.

In one embodiment, the second predetermined time can be 30 seconds, and is not limited to the embodiment herein. When the notification time is greater than 30 seconds, the execution module 17 executes the event as commanded.

In one embodiment, if the execution time is greater than the first predetermined time and the alternative coordinator exists, the coordinator 1 informs the event to the alternative coordinator rather than informing the sensors 2a to 2d.

The searching module 18 is configured to search for the alternative coordinator (the sensor 2a in coordinator mode). When the execution time is greater than the first predetermined time and the alternative coordinator is searched for by the searching module 18, the execution module 17 informs the alternative coordinator about the event. After the execution module 17 informs, the execution module 17 executes the event as commanded.

In one embodiment, the second determination module 16 is further configured to determine whether the alternative coordinator receives the event notification. When the alternative coordinator receives the event notification, the execution module 17 executes the event as commanded. When the alternative coordinator does not receive the event notification, the second determination module 16 is further configured to determine whether the notification time is greater than a fourth predetermined time. When the notification time is greater than the fourth predetermined time, the execution module 17 executes the event as commanded.

In one embodiment, the fourth predetermined time can be 35 seconds, and is not limited to the embodiment herein. When the notification time is greater than 35 seconds, the execution module 17 executes the event as commanded.

For example, the coordinator 1 receives a software update command and calculates that the software update will require 15 minutes. The execution time of the software update (15 minutes) is greater than the first predetermined time (10 minutes), thus the execution module 17 informs the software update to the alternative coordinator. After the execution module 17 informs, the execution module 17 executes the software update according to the software update command.

In one embodiment, when the searching module 18 does not search for an alternative coordinator and the execution time is greater than the first predetermined time, the second determination module 16 is further configured to determine whether the execution time is greater than a period of time for feedback (feedback time) from the sensors 2a to 2d.

In one embodiment, when the searching module 18 does not search for an alternative coordinator, this indicates that the sensor 2a is in the sensor mode or that the sensor 2a is not operating normally.

In one embodiment, the sensors 2a to 2d have the same cycle times and the same feedback times, and the feedback times are less than the cycle times. When the feedback time is 2 minutes, this means that the sensors 2a to 2d report the sensed data to the coordinator 1 or to the alternative coordinator after 2 minutes. After the sensors 2a to 2d report the sensed data, a next reporting time of the sensors 2a to 2d is according to the cycle times.

When the execution time is less than the feedback time, the execution module 17 executes the event as commanded. When the execution time is greater than the feedback time, the execution module 17 is further configured to await the receiving of reports from the sensors 2a to 2d. After the execution module 17 receives the reports (sensed data) of the sensors 2a to 2d, the execution module 17 executes the event as commanded. When a waiting time of the execution module 17 awaiting reports is greater than a third predetermined time, the execution module 17 executes the event as commanded.

In one embodiment, the third predetermined time is greater than the feedback time. For example, when the feedback time is 2 minutes, the third predetermined time can be 3 minutes, and are not limited to the embodiment herein.

Figure 4:
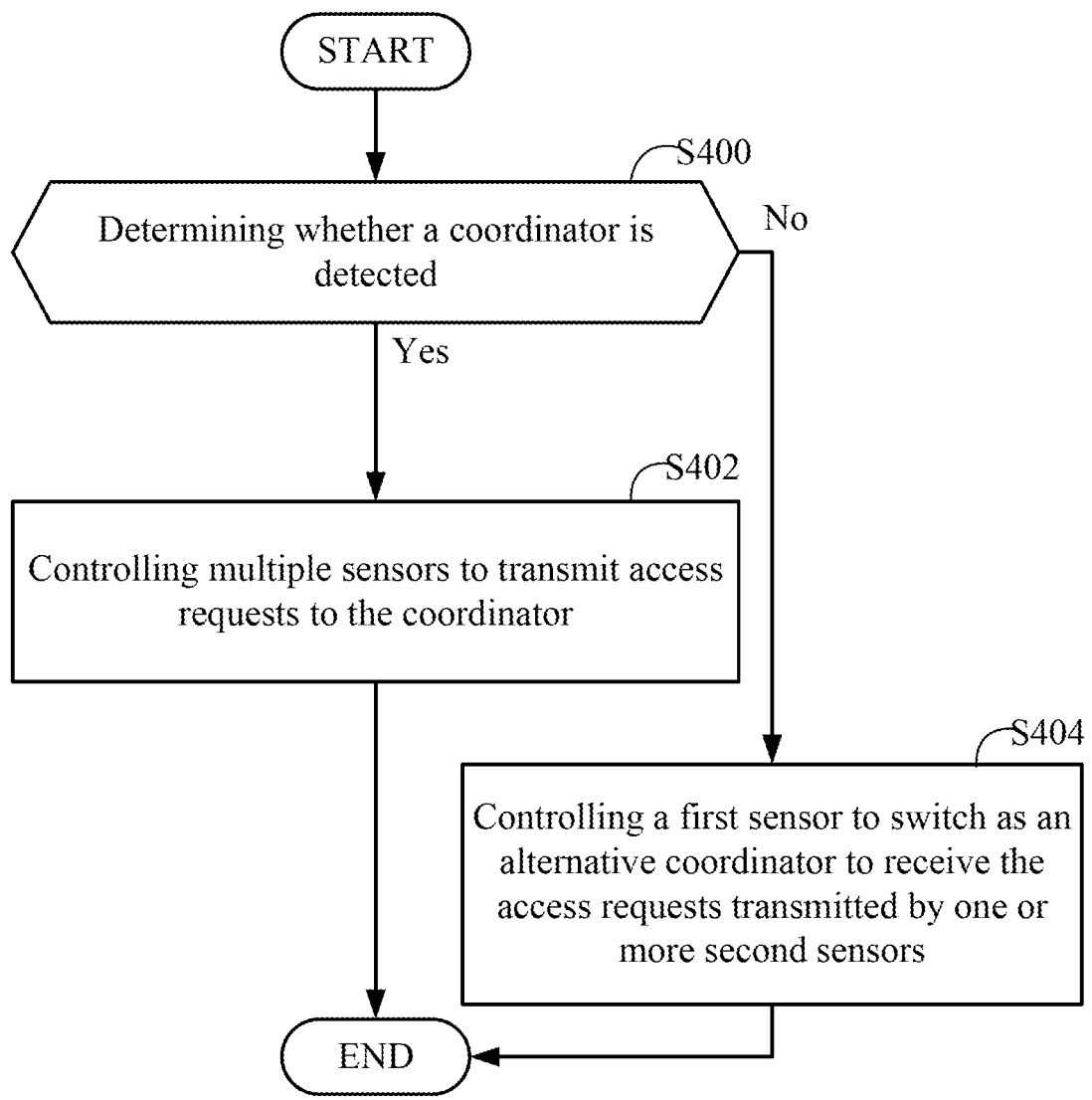
FIG. 4 is a flow diagram of an embodiment of a wireless sensing network communication method.

FIG. 4 illustrates an embodiment of a wireless sensing network communication method. The flowchart presents an example embodiment of the method. The example method is provided by way of example, as there are a variety of ways to carry out the method. The method described below can be carried out using the configurations illustrated in FIG. 2, for example, and various elements of these figures are referenced in explaining the example method. Each block shown in FIG. 4 represents one or more processes, methods, or subroutines, carried out in the example method. Furthermore, the illustrated order of blocks is illustrative only and the order of the blocks can change. Additional blocks can be added or fewer blocks may be utilized without departing from this disclosure. The example method can begin at block S400.

In block S400, the first determining module 11 determines whether the coordinator 1 is detected.

In block S402, the first mode establishing module 12 controls the sensors 2a to 2d to transmit the access requests to the coordinator 1 in response to the coordinator 1 being detected.

In block S404, the second mode establishing module 13 controls the sensor 2a to switch as the alternative coordinator and controls the sensors 2b to 2d to transmit the access requests to the alternative coordinator in response to the coordinator 1 being not detected.

In one embodiment, the first determination module 11 is further configured to determine whether the sensors 2a to 2d access the coordinator 1. When the sensors 2a to 2d access the coordinator 1, the sensors 2a to 2d communicate with the coordinator 1. When the sensor 2a cannot access the coordinator 1, the second mode establishing module 13 further controls the sensor 2a to switch as the alternative coordinator. When the sensor 2b cannot access the coordinator 1, the first determining module 11 further determines whether the alternative coordinator is detected. When the first determining module 11 does not detect the alternative coordinator, the setting module 14 sets the sensor 2b to redetect the coordinator 1 after the predetermined time.

When the first determining module 11 detects the alternative coordinator, the second mode establishing module 13 further controls the sensor 2b to transmit the access request to the alternative coordinator. When the sensor 2b access the alternative coordinator, the sensor 2b communicates with the alternative coordinator. When the sensor 2b cannot access to the alternative coordinator, the setting module 14 sets the sensor 2b to redetect the coordinator 1 after the predetermined time.

In one embodiment, when the coordinator 1 resumes operations and is detected by the first determining module 11, the second mode establishing module 13 further controls the sensor 2a to switch from the coordinator mode to the sensor mode. The sensor 2a disconnects communication from the sensors 2b to 2d. Thereby, the sensors 2a to 2d transmit future access requests to the coordinator 1.

Figure 5:
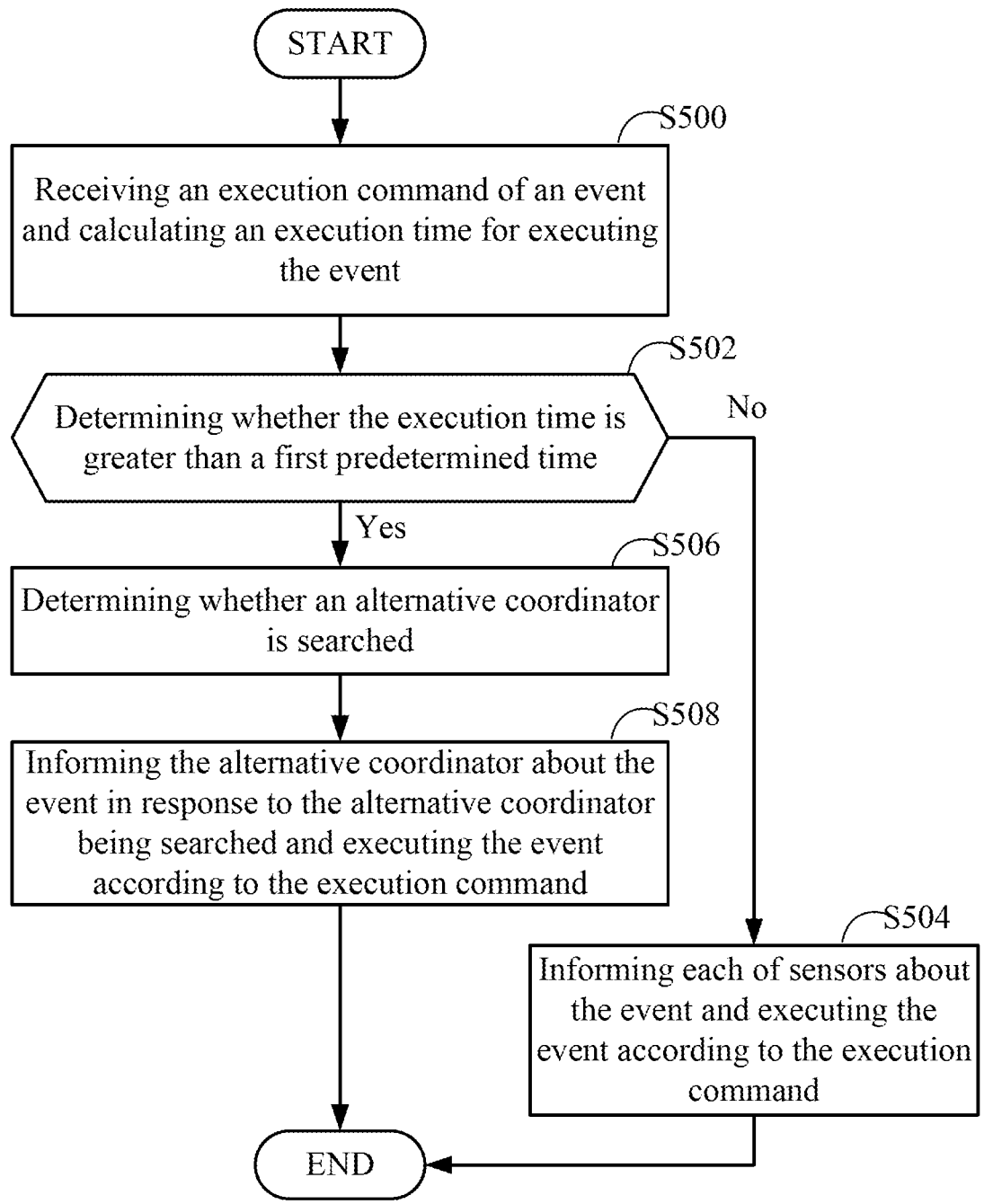
FIG. 5 is a flow diagram of an embodiment of a coordinator control method in a smart home system.

FIG. 5 illustrates an embodiment of a coordinator control method. The flowchart presents an example embodiment of the method. The example method is provided by way of example, as there are a variety of ways to carry out the method. The method described below can be carried out using the configurations illustrated in FIG. 3, for example, and various elements of these figures are referenced in explaining the example method. Each block shown in FIG. 5 represents one or more processes, methods, or subroutines, carried out in the example method. Furthermore, the illustrated order of blocks is illustrative only and the order of the blocks can change. Additional blocks can be added or fewer blocks may be utilized without departing from this disclosure. The example method can begin at block S500.

In block S500, the calculation module 15 receives an execution command of an event and calculates an execution time for executing the event.

In block S502, the second determination module 16 determines whether the execution time is greater than the first predetermined time.

In block S504, the execution module 17 informs each of the sensors 2a to 2d about the event and executes the event according to the execution command in response to the execution time being less than the first predetermined time.

In block S506, if the execution time is greater than the first predetermined time, the searching module 18 determines whether an alternative coordinator is searched in response to the execution time being greater than the first predetermined time.

In block S508, the execution module 17 informs the alternative coordinator about the event and executes the event according to the execution command in response to the alternative coordinator being searched.

In one embodiment, the second determination module 16 further determines whether each of the sensors 2a to 2d receives the event notification. When each of the sensors 2a to 2d receives the event notification, the execution module 17 executes the event according to the execution command. When one or more sensor do(es) not receive the event notification, the second determination module 16 further determines whether the notification time is greater than the second predetermined time. When the notification time is greater than the second predetermined time, the execution module 17 executes the event according to the execution command.

In one embodiment, when the execution time is greater than the first predetermined time and the alternative coordinator is searched by the searching module 18, the second determination module 16 further determines whether the alternative coordinator receives the event notification. When the alternative coordinator receives the event notification, the execution module 17 executes the event according to the execution command. When the alternative coordinator does not receive the event notification, the second determination module 16 further determines whether the notification time is greater than the fourth predetermined time. When the notification time is greater than the fourth predetermined time, the execution module 17 executes the event according to the execution command.

In one embodiment, when the searching module 18 cannot search the alternative coordinator and the execution time is greater than the first predetermined time, the second determination module 16 further determines whether the execution time is greater than the feedback time of the sensors 2a to 2d.

When the execution time is less than the feedback time, the execution module 17 executes the event according to the execution command. When the execution time is greater than the feedback time, the execution module 17 further awaits the receiving of the reports from the sensors 2a to 2d. After the execution module 17 receives the reports, the execution module 17 executes the event according to the execution command. When a waiting time for awaiting the reposts is greater than the third predetermined time, the execution module 17 executes the event according to the execution command.

Figure 6:
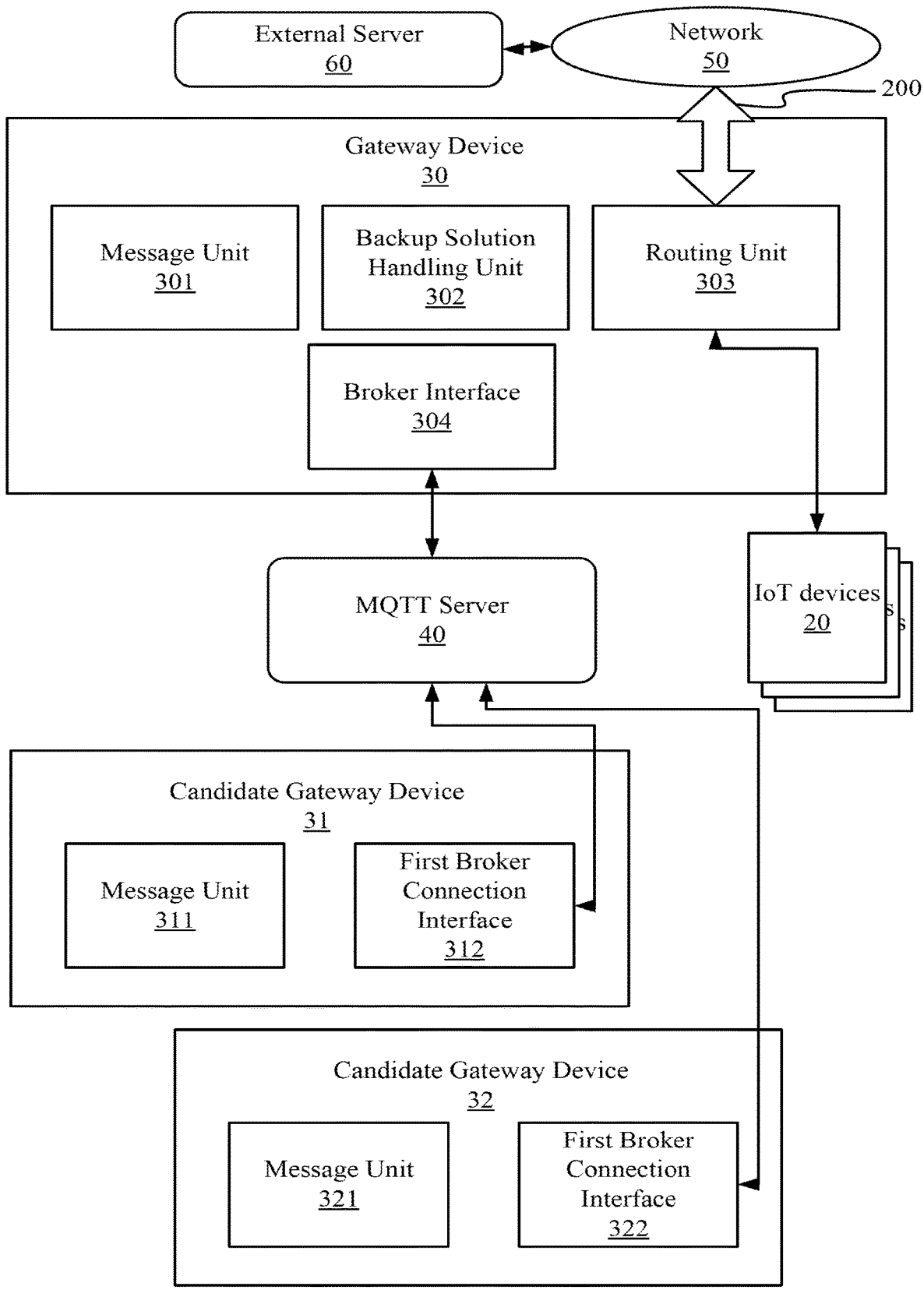
FIG. 6 is a diagram of an alternative embodiment of a smart home system.

With reference to FIG. 6, a wireless sensing network comprises internet of things (IoT) devices 20, gateway devices 30, 31, and 32, servers 40 and 60. A gateway device 30 is connected to a queuing telemetry transport (MQTT) server 40. MQTT is an International Organization for Standardization (ISO) standard ISO/IEC 20922, which is a publish-subscribe-based messaging protocol. Candidate gateway devices 31 and 32 may connect to the MQTT server 40. A plurality of IoT devices 20 are connected to the gateway device 30 and transmit sensor data to a routing unit 303 of the gateway device 30. The routing unit 303 in the gateway device 30 transfers the sensor data to an external server 60 through a backhaul 200 and a network 20. The server 60 may store and further process the sensor data, such as presenting the sensor data through graphical user interfaces. For example, the server 40 may use the sensor data to train one or more machine learning models and use the trained models for artificial intelligence services.

Figure 7:
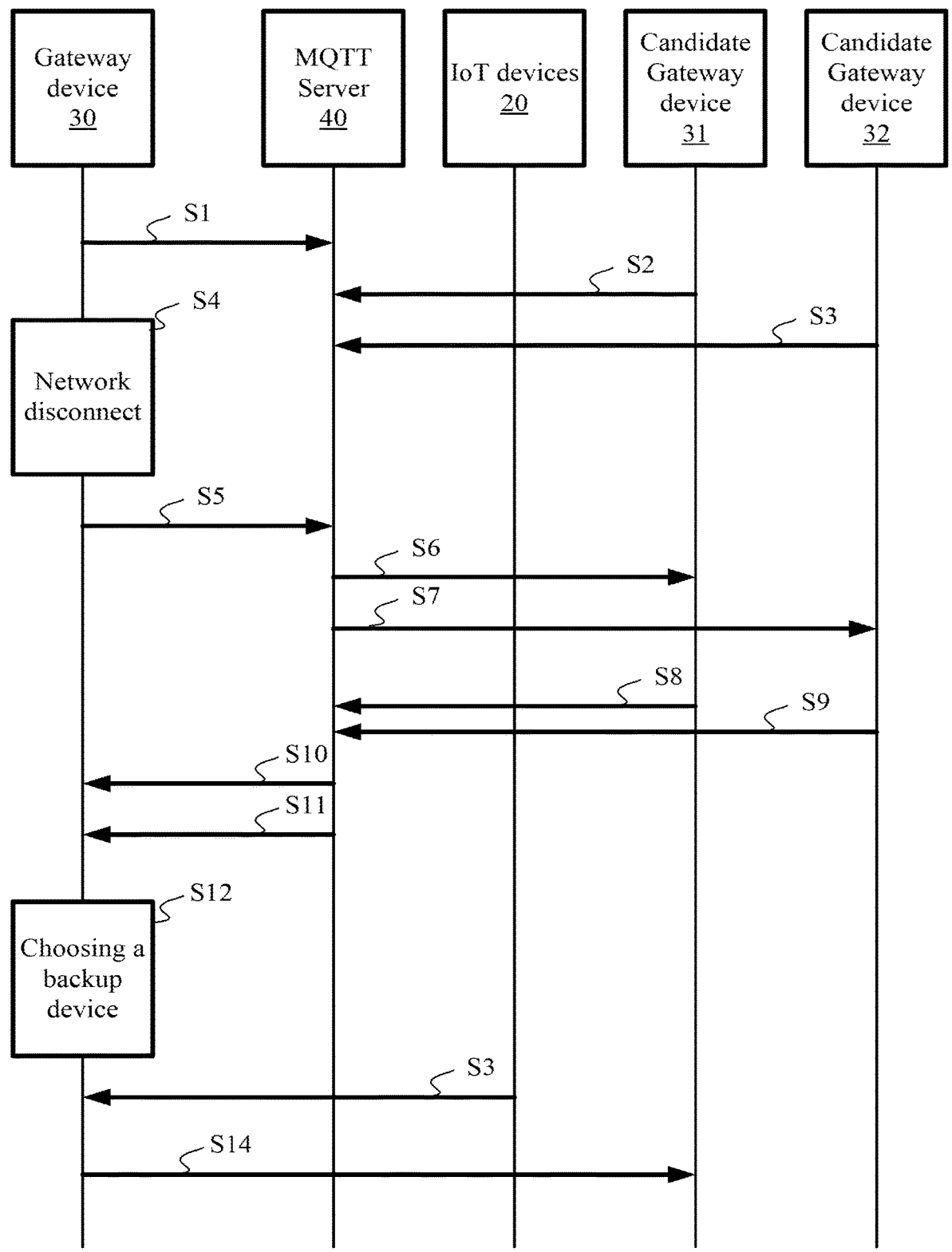
FIG. 7 is a flow diagram of an alternative embodiment of a wireless sensing network communication method of the disclosure.

FIG. 7 illustrates a message unit 301 in the gateway device 30 issuing subscription for backup device information through a broker interface 304 to the MQTT server 40 (block S1). In an embodiment of the disclosure, the backup device information comprises capability information of backup devices for the gateway device 30. The candidate gateway devices 31 and 32 are backup devices for the gateway device 30. In another embodiment of the disclosure, the backup device information comprises capability information of backup devices of the coordinator 1. The sensors 2a and 2b are backup devices of the coordinator 1. The message unit 301 serves as a MQTT client. A message unit 311 in the candidate gateway device 31 issues first subscription for disconnection information through a first broker connection interface 312 to the MQTT server 40 (block S2). The message unit 311 serves as a MQTT client. A message unit 321 in the candidate gateway device 32 issues second subscription for disconnection information through a second broker connection interface 322 to the MQTT server 40 (block S3). The message unit 321 serves as a MQTT client.

The routing unit 303 in the gateway device 30 continues receiving sensor data from the IoT device 20. In an embodiment of the disclosure, the IoT devices 20 may include the coordinator 1 and sensors 2a-2d. In an embodiment of the disclosure, the gateway device 30 serves as the controller 3. In one embodiment, each of the sensor 2a and sensor 2b comprises two operation modes.

The routing unit 303 transfers the received sensor data through the primary backhaul 200 to the external server 60 for data logging when no network disconnection event occurs.

In an embodiment of the disclosure, when the present backhaul 200 is disconnected, the message unit 301 detects a network disconnection event associated with the primary backhaul 200 (block S4), and publishes the network disconnection event through the broker interface 304 to the MQTT server 40 (block S5). The MQTT server 40 publishes the network disconnection event associated with the primary backhaul 200 to the candidate gateway devices 31 and 32 (block S6 and S7).

The message unit 311 in the candidate gateway device 31 receives the network disconnection event as the disconnection information according to the first subscription of the disconnection information (block S6). The message unit 311 in the candidate gateway device 31 publishes a first backup device capability message through the first broker connection interface 312 to the MQTT server 40 upon receiving the network disconnection event (block S8).

The message unit 321 in the candidate gateway device 32 receives the network disconnection event as the disconnection information according to the second subscription of the disconnection information (block S7). The message unit 321 in the candidate gateway device 32 publishes a second backup device capability message through the second broker connection interface 322 to the MQTT server 40 upon receiving the network disconnection event (block S9). The MQTT server 40 publishes the first backup device capability message and the second backup device capability message to the gateway device 30.

The message unit 301 receives the first backup device capability message and the second backup device capability message as the backup device information through the broker interface 304 according to the subscription as a consequence of the publishing of the network disconnection event. Each of the first backup device capability message and the second backup device capability message comprises a device identifier, computation capability, channel bandwidth, device workload, memory capacity, and measured temperature. The first backup device capability message has a first device identifier, computation capability, channel bandwidth, device workload, memory capacity, and measured temperature of the candidate gateway device 31. The second backup device capability message has a second device identifier, computation capability, channel bandwidth, device workload, memory capacity, and measured temperature of the candidate gateway device 32.

A backup solution handing unit 302 selects a selected device identifier from the first device identifier and the second device identifier based on the first backup device capability message and the second backup device capability message and directs the routing unit 303 to encapsulate the sensor data with a header, wherein the header has a transmission destination associated with the selected device identifier (block S12). The transmission destination in the header represents a selected candidate gateway device. The transmission destination in the header may be represented by the selected device identifier. The selected device identifier may comprise one of more selected from a product serial number, a medium access control (MAC) address, and an Internet protocol (IP) address.

The routing unit 303 in the gateway device 30 continues receiving sensor data from the IoT device 20 (block S13).

The routing unit 303 transfers the received sensor data through the transmission destination to the external server 60 for data logging rather than through the primary backhaul 200 when the network disconnection event occurs (block S14). In the condition that the first device identifier of the candidate gateway device 31 is selected as the selected device identifier, the transmission destination targets to the candidate gateway device 31. The candidate gateway device 31 receives and transfers the sensor data through a first candidate backhaul to the external server 60.

In the condition that the second device identifier of the candidate gateway device 32 is selected as the selected device identifier, the transmission destination targets to the candidate gateway device 32. The candidate gateway device 32 receives and transfers the sensor data through a second candidate backhaul to the external server 60.

In the block S12, the backup solution handling unit 302 obtains a first score of the first backup device capability message from a weighted sum of the computation capability, channel bandwidth, device workload, memory capacity, and measured temperature in the first backup device capability message, and obtains a second score of the second backup device capability message from a weighted sum of the computation capability, channel bandwidth, device workload, memory capacity, and measured temperature in the second backup device capability message. The backup solution handling unit 302 selects a selected device identifier from the first device identifier and the second device identifier based on comparison of the first score and the second score. An exemplary formula for calculating the score S of each candidate gateway device is in the following:

$$S = w1*B - w2*1/e + w3*C + w4*1/L + w5*M + w6*1/T \quad (1)$$

Wherein each of w1, w2, w3, w4, w5, and w6 is weight. Weight may be adjustable. Variable B is available channel bandwidth of a backup device, for example, in a unit of mega bit per second (Mbps). Variable e is battery life obtained from G/A', where G is battery capacity or a backup device, for example, in a unit of ampere hour (Ah), and A' is the current consumed by a backup device. Note that if the device is plugged with a power plug, the e=∞. Variable C is a central processing unit (CPU) frequency of a backup device, for example, in a unit of mega hertz (MHz). Variable L is CPU workload of a backup device, for example, measured in percentage (%). Variable M is remaining memory capacity of a backup device, for example, measured in a unit of mega byte (MB). Variable T is CPU temperature of a backup device measured, for example, in Celsius temperature degree.

A channel bandwidth B of the candidate gateway device 31 may be the available bandwidth of the first candidate backhaul. Alternatively, a channel bandwidth B of the candidate gateway device 31 may be the available bandwidth of a first connection between the candidate gateway device 31 and the gateway device 30. Further, a channel bandwidth B of the candidate gateway device 31 may be a less than one selected from the available bandwidth of the first candidate backhaul and the available bandwidth of the first connection. Similarly, a channel bandwidth B of the candidate gateway device 32 may be the available bandwidth of the second candidate backhaul. Alternatively, a channel bandwidth B of the candidate gateway device 32 may be the available bandwidth of a second connection between the candidate gateway device 32 and the gateway device 30. Further, a channel bandwidth B of the candidate gateway device 32 may be a less than one selected from the available bandwidth of the second candidate backhaul and the available bandwidth of the second connection.

The backup solution handling unit 302 may selects the first device identifier as the selected device identifier when a score of the candidate gateway device 31 is greater than a score of the candidate gateway device 32. The backup solution handling unit 302 may selects the second device identifier as the selected device identifier when a score of the candidate gateway device 32 is greater than a score of the candidate gateway device 31.

The backup solution handling unit 302 may obtain device capability associated with the selected device identifier, and determine whether the capability associated with the selected device identifier matches a restricted backup status or a normal backup status. The backup solution handling unit 302 directs the message unit 301 to broadcast a command to enable the restricted backup status to restrict traffic of the sensor data when the capability associated with the selected device identifier matches the restricted backup status. Each of the IoT devices upon receiving the command restricts generating traffic of sensor data. If sensor data is categorized into different categories, an IoT device transmits sensor data of a category with higher priority based on the command enabling the restricted backup status and delay transmission of sensor data of a category with lower priority.

The backup solution handling unit 302 may further obtain device capability associated with the selected device identifier, and determine whether the capability associated with the selected device identifier matches the restricted backup status or the normal backup status. The backup solution handling unit 302 directs the message unit 301 to broadcast a command to disable the restricted backup status when the capability associated with the selected device identifier matches the normal backup status.

In another embodiment of the disclosure, backup devices of the coordinator 1 issues subscription for disconnection information through the MQTT server 40.

When the backhaul 201 is disconnected, the message unit 301 detects a network disconnection event associated with the backhaul 201, and publishes the network disconnection event through the broker interface 304 to the MQTT server 40. The MQTT server 40 publishes the network disconnection event associated with the primary backhaul 201 to the backup devices of the coordinator 1.

Each of the backup devices of the coordinator 1 receives the network disconnection event as the disconnection information according to subscription of the disconnection information and publishes capability message of the backup device through the MQTT server 40 in response.

For example, the message unit 301 receives a third backup device capability message and a fourth backup device capability message as the backup device information through the broker interface 304 according to the subscription as a consequence of the publishing of the network disconnection event. Each of the third backup device capability message and the fourth backup device capability message comprises a device identifier, computation capability, channel bandwidth, device workload, memory capacity, and measured temperature. The third backup device capability message has a third device identifier, computation capability, channel bandwidth, device workload, memory capacity, and measured temperature of the sensor 2a. The fourth backup device capability message has a fourth device identifier, computation capability, channel bandwidth, device workload, memory capacity, and measured temperature of the sensor 2b.

The backup solution handing unit 302 selects a selected device identifier from the third device identifier and the fourth device identifier based on the third backup device capability message and the fourth backup device capability message and directs the sensors 2a-2d to encapsulate the sensor data with a header, wherein the header has a transmission destination associated with the selected device identifier.

The backup solution handling unit 302 may obtain a third score from the third backup device capability message based on the formula (1). Similarly, the backup solution handling unit 302 may obtain a fourth score from the fourth backup device capability message based on the formula (1). The backup solution handing unit 302 selects a selected device identifier from the third device identifier and the fourth device identifier based on a comparison between the third and fourth scores.

The sensors 2a-2d transmit the received sensor data through the transmission destination to the external server 60 for data logging rather than through the primary backhaul 201 when the network disconnection event occurs. In a condition that the third device identifier of the sensor 2a is selected as the selected device identifier, the transmission destination targets to the sensor 2a. The sensor 2a receives and transfers the sensor data through a third candidate backhaul and the gateway device 30 to the external server 60. In the condition that the fourth device identifier of the sensor 2b is selected as the selected device identifier, the transmission destination targets to the sensor 2b. The sensor 2b receives and transfers the sensor data through a fourth candidate backhaul and the gateway device 30 to the external server 60.

The modules 301-304, 311, 312, 321, and 322 can include one or more software programs in the form of computerized codes. The computerized codes can include instructions that can be executed by a processor to provide functions for the modules 301-304, 311, 312, 321, and 322.

Figure 8:
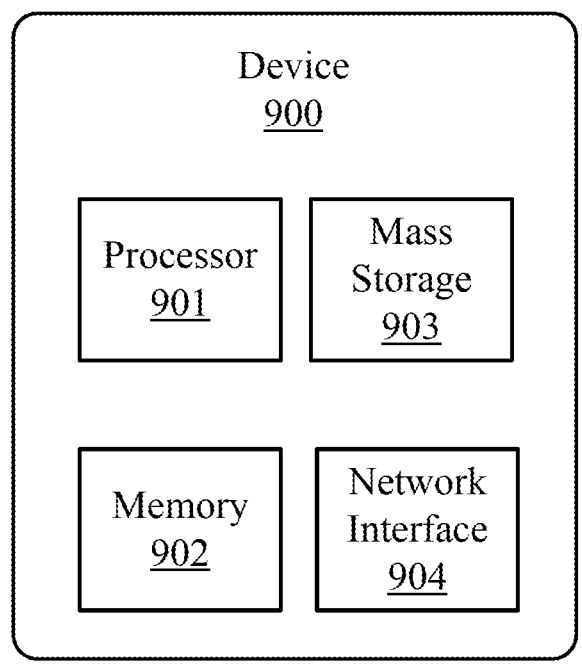
FIG. 8 is a diagram of an alternative embodiment of a device of the disclosure.

FIG. 8 illustrates the method of the disclosure being implemented by computer programs stored in storage media, such mass storage 903 in a device 900. The computer program implementing the disclosed method when loaded to a memory 902 by a processor 901 directs the processor 901 in the device 900 to execute the disclosed method. The processor 901 may communicate with other entities through a networking interface 904. Each of the gateway device 30, 31, 32, and MQTT server 40 in FIG. 6 may implemented as an embodiment of the device 900. Alternative, all of any combination of the ateway device 30, 31, 32, and MQTT server 40 may simultaneously run in one or more virtual machines in the device 900 or in a plurality of embodiments of the device 900.

The disclosure provide a failover method for a gateway device and a coordinator in a wireless sensing network.

The embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A wireless sensing network communication method comprising:
   issuing subscription for backup device information through a broker interface;
   receiving sensor data;
   transferring the received sensor data through a primary backhaul for data logging when no network disconnection event occurs;
   detecting a network disconnection event associated with the primary backhaul;
   publishing the network disconnection event through the broker interface when the network disconnection event associated with the primary backhaul is detected;
   receiving a first backup device capability message and a second backup device capability message as the backup device information through the broker interface according to the subscription as a consequence of the publishing of the network disconnection event, wherein each of the first backup device capability message and the second backup device capability message comprises a device identifier, computation capability, channel bandwidth, device workload, memory capacity, and measured temperature, the first backup device capability message has a first device identifier, and the second backup device capability message has a second device identifier;

selecting a selected device identifier from the first device identifier and the second device identifier based on the first backup device capability message and the second backup device capability message;

encapsulating the sensor data with a header, wherein the header has a transmission destination associated with the selected device identifier; and transferring the received sensor data through the transmission destination for data logging rather than through the primary backhaul when the network disconnection event occurs.

2. The wireless sensing network communication method of claim 1, further comprising:

obtaining a first score of the first backup device capability message from a weighted sum of the computation capability, channel bandwidth, device workload, memory capacity, and measured temperature in the first backup device capability message;

obtaining a second score of the second backup device capability message from a weighted sum of the computation capability, channel bandwidth, device workload, memory capacity, and measured temperature in the second backup device capability message; and selecting a selected device identifier from the first device identifier and the second device identifier based on comparison of the first score and the second score.

3. The wireless sensing network communication method of claim 1, further comprising:

obtaining device capability associated with the selected device identifier;

determining whether the capability associated with the selected device identifier matches a restricted backup status or a normal backup status; and broadcasting a command to enable the restricted backup status to restrict traffic of the sensor data when the capability associated with the selected device identifier matches the restricted backup status.

4. The wireless sensing network communication method of claim 3, further comprising:

obtaining device capability associated with the selected device identifier;

determining whether the capability associated with the selected device identifier matches the restricted backup status or the normal backup status; and broadcasting a command to disable the restricted backup status when the capability associated with the selected device identifier matches the normal backup status.

5. The wireless sensing network communication method of claim 1, further comprising:

issuing by a first backup device first subscription for disconnection information through a first broker connection interface;

receiving by a first backup device the network disconnection event as the disconnection information according to the first subscription of the disconnection information; and publishing by a first backup device the first backup device capability message through the first broker connection interface.

6. The wireless sensing network communication method of claim 5, further comprising:

transferring the received sensor data through a first backhaul for data logging when the first device identifier associated with the first backup device is selected as the selected device identifier.

7. The wireless sensing network communication method of claim 5, further comprising:

issuing by a second backup device second subscription for disconnection information through a second broker connection interface;

receiving by a second backup device the network disconnection event as the disconnection information according to the second subscription of the disconnection information; and publishing by a second backup device the second backup device capability message through the second broker connection interface.

8. The wireless sensing network communication method of claim 7, further comprising:

transferring the received sensor data through a second backhaul for data logging when the second device identifier associated with the second backup device is selected as the selected device identifier.

9. The wireless sensing network communication method of claim 1, further comprising:

determining whether a coordinator is detected, wherein multiple sensors transmit access requests to the coordinator to keep the multiple sensors providing data as normal, in response to the coordinator being detected; and controlling a first sensor to switch to be an alternative coordinator to receive the access requests transmitted by one or more second sensors to keep the second sensors providing data as normal, in response to the coordinator being not detected;

wherein when the first sensor is switched to be the alternative coordinator, the second sensors accesses the alternative coordinator, and the second sensors stop searching for the coordinator;

wherein the multiple sensors comprise the first sensor and the one or more second sensors.

* * * * *